(12) United States Patent
McClure et al.

(10) Patent No.: US 7,373,231 B2
(45) Date of Patent: May 13, 2008

(54) ARTICULATED EQUIPMENT POSITION CONTROL SYSTEM AND METHOD

(75) Inventors: John A. McClure, Scottsdale, AZ (US); Richard W. Heiniger, Parkville, MO (US); John T. E. Timm, Tempe, AZ (US); Kent D. Funk, Robinson, KS (US); Richard B. Wong, Phoenix, AZ (US)

(73) Assignee: Hemisphere GPS LLC, Calgary, Alberta (CA)

( * ) Notice: Subject to any disclaimer, the term of this patent is extended or adjusted under 35 U.S.C. 154(b) by 0 days.

(21) Appl. No.: 11/650,784

(22) Filed: Jan. 8, 2007

(65) Prior Publication Data

US 2007/0112493 A1    May 17, 2007

Related U.S. Application Data

(63) Continuation of application No. 10/733,960, filed on Dec. 11, 2003, now Pat. No. 7,162,348.

(60) Provisional application No. 60/432,719, filed on Dec. 11, 2002.

(51) Int. Cl.
*G06F 19/00* (2006.01)
(52) U.S. Cl. .......................... 701/50; 701/41; 280/456.1
(58) Field of Classification Search .................. 701/50, 701/41, 1; 280/456.1; 172/2, 4.5
See application file for complete search history.

(56) References Cited

U.S. PATENT DOCUMENTS

| | | |
|---|---|---|
| 3,727,710 A | 4/1973 | Sanders et al. |
| 3,737,710 A | 6/1973 | Waymouth et al. |
| 3,899,028 A | 8/1975 | Morris et al. |
| 4,132,272 A | 1/1979 | Holloway et al. |
| 4,180,133 A | 12/1979 | Collogan et al. |
| 4,453,614 A | 6/1984 | Allen et al. |

(Continued)

FOREIGN PATENT DOCUMENTS

JP       07244150       9/1995

(Continued)

OTHER PUBLICATIONS

Parkinson, Bradford W., et al., "Global Positioning System: Theory and Applications, vol. II", *Bradford W. Parkinson and James J. Spiker, Jr., eds., Global Positioning System: Theory and Application, vol. II*, 1995, AIAA, Reston, Va, USA, pp. 3-50, (1995), 3-50.

(Continued)

*Primary Examiner*—Thomas Black
*Assistant Examiner*—Marie A Weiskopf
(74) *Attorney, Agent, or Firm*—Mark Brown

(57) ABSTRACT

An articulated equipment position control system and method are provided for equipment consisting of motive and working components. The components are connected by an articulated connector, such as a pivotal hitch. GPS-derived positional data is utilized for power-articulating the hitch to maintain the working component, such as an implement, on a predetermined course. Operator-inducted course deviations can thus be corrected. The working component can also be positioned to follow the course of the movive component. The system includes a microprocessor control subsystem, which interfaces with a steering guidance system.

11 Claims, 14 Drawing Sheets

U.S. PATENT DOCUMENTS

| | | |
|---|---|---|
| 4,637,474 A | 1/1987 | Leonard |
| 4,751,512 A | 6/1988 | Longaker |
| 4,802,545 A | 2/1989 | Nystuen et al. |
| 4,812,991 A | 3/1989 | Hatch |
| 4,858,132 A | 8/1989 | Holmquist |
| 4,918,607 A | 4/1990 | Wible |
| 5,031,704 A | 7/1991 | Fleischer et al. |
| 5,148,179 A | 9/1992 | Allison |
| 5,152,347 A | 10/1992 | Miller |
| 5,155,490 A | 10/1992 | Spradley, Jr. et al. |
| 5,156,219 A | 10/1992 | Schmidt et al. |
| 5,202,829 A | 4/1993 | Geier |
| 5,207,239 A | 5/1993 | Schwitalla |
| 5,255,756 A | 10/1993 | Follmer et al. |
| 5,296,861 A | 3/1994 | Knight |
| 5,323,322 A | 6/1994 | Mueller et al. |
| 5,365,447 A | 11/1994 | Dennis |
| 5,369,589 A | 11/1994 | Steiner |
| 5,375,059 A | 12/1994 | Kyrtsos et al. |
| 5,389,934 A | 2/1995 | Kass |
| 5,390,125 A | 2/1995 | Sennott et al. |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson et al. |
| 5,511,623 A | 4/1996 | Frasier |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,564,632 A | 10/1996 | Prohazka |
| 5,583,513 A | 12/1996 | Cohen |
| 5,592,382 A | 1/1997 | Colley |
| 5,608,393 A | 3/1997 | Hartman |
| 5,610,616 A | 3/1997 | Vallot et al. |
| 5,610,845 A | 3/1997 | Slabinski et al. |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,644,139 A | 7/1997 | Allen et al. |
| 5,664,632 A | 9/1997 | Frasier |
| 5,684,696 A | 11/1997 | Rao et al. |
| 5,702,070 A | 12/1997 | Waid |
| 5,717,593 A | 2/1998 | Gvili |
| 5,725,230 A | 3/1998 | Walkup |
| 5,739,785 A | 4/1998 | Allison |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,821,900 A | 10/1998 | Kishimoto |
| 5,828,336 A | 10/1998 | Yunck et al. |
| 5,838,562 A | 11/1998 | Gudat et al. |
| 5,862,501 A | 1/1999 | Talbot et al. |
| 5,875,408 A | 2/1999 | Bendett et al. |
| 5,899,957 A | 5/1999 | Loomis |
| 5,903,235 A | 5/1999 | Nichols |
| 5,917,448 A | 6/1999 | Mickelson |
| 5,918,558 A | 7/1999 | Susag |
| 5,923,270 A | 7/1999 | Sampo et al. |
| 5,928,309 A | 7/1999 | Korver et al. |
| 5,933,110 A | 8/1999 | Tang et al. |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Dusseldorp |
| 5,945,917 A | 8/1999 | Harry |
| 5,956,250 A | 9/1999 | Gudat et al. |
| 5,969,670 A | 10/1999 | Kalafus et al. |
| 5,987,383 A | 11/1999 | Keller et al. |
| 6,014,608 A | 1/2000 | Seo |
| 6,018,313 A | 1/2000 | Engelmayer et al. |
| 6,023,239 A | 2/2000 | Kovach |
| 6,049,304 A | 4/2000 | Rudel et al. |
| 6,052,647 A | 4/2000 | Parkinson et al. |
| 6,057,800 A | 5/2000 | Yang et al. |
| 6,061,632 A | 5/2000 | Dreier |
| 6,062,317 A | 5/2000 | Gharsalli |
| 6,076,612 A | 6/2000 | Carr et al. |
| 6,100,842 A | 8/2000 | Dreier et al. |
| 6,122,595 A | 9/2000 | Varley et al. |
| 6,144,335 A | 11/2000 | Rogers et al. |
| 6,191,733 B1 | 2/2001 | Dizchavez |
| 6,198,430 B1 | 3/2001 | Hwang et al. |
| 6,198,992 B1 | 3/2001 | Winslow |
| 6,199,000 B1 | 3/2001 | Keller et al. |
| 6,205,401 B1 | 3/2001 | Pickhard et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz et al. |
| 6,253,160 B1 | 6/2001 | Hanseder |
| 6,256,583 B1 | 7/2001 | Sutton |
| 6,259,398 B1 | 7/2001 | Riley |
| 6,285,320 B1 | 9/2001 | Olster et al. |
| 6,292,132 B1 | 9/2001 | Wilson |
| 6,304,210 B1 | 10/2001 | Allison et al. |
| 6,313,788 B1 | 11/2001 | Wilson |
| 6,314,348 B1 | 11/2001 | Winslow |
| 6,324,473 B1 | 11/2001 | Eschenbach |
| 6,325,684 B1 | 12/2001 | Knight |
| 6,336,066 B1 | 1/2002 | Pellenc et al. |
| 6,345,231 B2 | 2/2002 | Quincke |
| 6,371,416 B1 | 4/2002 | Hawthorne |
| 6,377,889 B1 | 4/2002 | Soest |
| 6,389,345 B2 | 5/2002 | Phelps |
| 6,392,589 B1 | 5/2002 | Rogers et al. |
| 6,397,147 B1 | 5/2002 | Whitehead |
| 6,411,254 B1 | 6/2002 | Moeglein et al. |
| 6,415,229 B1 | 7/2002 | Diekhans |
| 6,421,003 B1 | 7/2002 | Riley et al. |
| 6,425,186 B1 | 7/2002 | Oliver |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,515,619 B1 | 2/2003 | McKay, Jr. |
| 6,539,303 B2 | 3/2003 | McClure et al. |
| 6,542,077 B2 | 4/2003 | Joao |
| 6,553,299 B1 | 4/2003 | Keller et al. |
| 6,553,311 B2 | 4/2003 | Lange et al. |
| 6,567,041 B1 | 5/2003 | O'Dell |
| 6,587,761 B2 | 7/2003 | Kumar et al. |
| 6,611,228 B2 | 8/2003 | Toda et al. |
| 6,618,671 B2 | 9/2003 | Dooley et al. |
| 6,631,916 B1 | 10/2003 | Miller |
| 6,643,576 B1 | 11/2003 | O'Connor et al. |
| 6,646,603 B2 | 11/2003 | Dooley et al. |
| 6,657,585 B1 | 12/2003 | Kucik |
| 6,671,587 B2 | 12/2003 | Hrovat et al. |

| | | | |
|---|---|---|---|
| 6,688,403 B2 | 2/2004 | Bernhardt et al. | |
| 6,703,973 B1 | 3/2004 | Nichols | |
| 6,711,501 B2 | 3/2004 | McClure et al. | |
| 6,756,938 B2 | 6/2004 | Zhao et al. | |
| 6,788,951 B2 | 9/2004 | Aoki et al. | |
| 6,792,380 B2 | 9/2004 | Toda | |
| 6,819,269 B2 | 11/2004 | Flick | |
| 6,822,314 B2 | 11/2004 | Beasom | |
| 6,865,465 B2 | 3/2005 | McClure | |
| 6,865,484 B2 | 3/2005 | Miyasaka | |
| 6,922,635 B2 | 7/2005 | Rorabaugh | |
| 7,026,982 B2 | 4/2006 | Toda et al. | |
| 7,027,918 B2 | 4/2006 | Zimmerman et al. | |
| 7,031,725 B2 | 4/2006 | Rorabaugh | |
| 7,162,348 B2 * | 1/2007 | McClure et al. | 701/50 |
| 7,162,384 B1 * | 1/2007 | Browning et al. | 702/99 |
| 2002/0029110 A1 | 3/2002 | Fukuda et al. | |
| 2002/0038171 A1 | 3/2002 | Deguchi et al. | |
| 2002/0072850 A1 | 6/2002 | McClure et al. | |
| 2002/0165648 A1 | 11/2002 | Zeitler | |
| 2002/0165669 A1 | 11/2002 | Pinto et al. | |
| 2002/0175858 A1 | 11/2002 | Takahashi | |
| 2003/0009282 A1 | 1/2003 | Upadhyaya et al. | |
| 2003/0187560 A1 | 10/2003 | Keller et al. | |
| 2004/0186644 A1 | 9/2004 | McClure et al. | |
| 2004/0210357 A1 | 10/2004 | McKay et al. | |
| 2004/0212533 A1 | 10/2004 | Whitehead | |
| 2005/0116859 A1 | 6/2005 | Miller | |
| 2006/0017611 A1 | 1/2006 | Hatch et al. | |

FOREIGN PATENT DOCUMENTS

| | | | |
|---|---|---|---|
| WO | WO98/36288 | 8/1998 | |
| WO | WO0024239 | 5/2000 | |
| WO | WO03019430 | 3/2003 | |
| WO | WO2005/119386 | 12/2005 | |

OTHER PUBLICATIONS

"http://www.patentstorm.us/class/342/357.11-Attitude_determination.html".

"Orthman Manufacturing Co., www.orthman.com/htm;guidance.htm", regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers vol. 1, Monetrey. California American Institute of Aeronautics and Astronautics, Inc.*, (May 2004), 136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Han, Shaowel et al., "Single-Epoch Ambiguity Resolution for Real-Time GPS Attitude Determination with the Aid of One-Dimensional Optical Fiber Gyro", *GPS Solutions, vol. 3, No. 1, pp. 5-12 (1999) John Wiley 7 Sons*, Inc.

Park, Chansik et al., "Integer Ambiguity Resolution for GPS Based Attitude Determination Systems", SICE '09, Jul. 29-31, Chiba, 1115-1120.

"International Search Report and Written Opinion", *PCT/US2004/015678, filed May 17, 2004, mailed Jun. 21, 2005*.

"ISO" *11783 Part 7 Draft Amendment 1 Annex, Paragraphs B.6 and B.7.ISO 11792-7 2004 DAM1, ISO: Mar. 8, 2004*.

* cited by examiner

SETUP: HITCH CALIBRATE MENU

| MENU ITEM | DISPLAY SEQUENCE | INSTRUCTIONS |
|---|---|---|
| POSITION | ADJ LEFT?? ENTER TO UPDATE | PRESS LEFT ARROW UNTIL HITCH PIN IS AT FAR LEFT POSITION PRESS ENTER TO UPDATE LEFT POSITION. |
| | ADJ RIGHT?? ENTER TO UPDATE | PRESS RIGHT ARROW UNTIL HITCH PIN IS AT FAR RIGHT POSITION PRESS ENTER TO UPDATE RIGHT POSITION. |
| | ADJ CENTER?? ENTER TO UPDATE | PRESS LEFT ARROW UNTIL HITCH PIN IN THE CENTER. PRESS ENTER TO UPDATE CENTER POSITION. |
| CURVE | ADJ CURVE?? ENTER TO UPDATE | DRIVE AROUND A CURVE ON RELATIVELY FLAT GROUND AND OBSERVE TRAILING IMPLEMENT TRACKING. PRESS LEFT OR RIGHT ARROW UNTIL IMPLEMENT TRACK MATCHES THE TRACTOR. PRESS ENTER TO UPDATE CURVATURE COMPENSATION VALUE. |
| SLOPE | >ON OFF | SELECT IF TILT SENSOR IS TO BE USED FOR SIDE SLOPE COMPENSATION. |
| | >ON OFF | PARK THE TRACTOR ON A NEARLY LEVEL SURFACE. PRESS ENTER TO UPDATE THE LEVEL REFERENCE VALUE. |

FIG. 10A

ARTICULATED EQUIPMENT POSITION CONTROL SYSTEM AND METHOD

CROSS-REFERENCE TO RELATED APPLICATION

This application is a continuation and claims the benefit of U.S. patent application Ser. No. 10/733,960, filed Dec. 11, 2003, now U.S. Pat. No. 7,162,348, issued Jan. 9, 2007, which claims the benefit of U.S. provisional application No. 60/432,719, filed Dec. 11, 2002, which are incorporated herein by reference.

BACKGROUND OF THE INVENTION

1. Field of the Invention

The present invention relates generally to articulated equipment position control, and particularly to a system and method for DGPS-based positioning of an operative piece of equipment, such as a farm implement, which is pulled, pushed or carried by a motive piece of equipment, such as a tractor, by manipulation of a power-articulated connection therebetween.

2. Description of the Related Art

Various equipment systems include articulated components. For example, a common configuration involves a "motive" component, which supplies the motive force for pulling, pushing or carrying a "working" component through an articulated connection located therebetween. For example, tractors serve as motive components in agricultural and other operations. The working components can comprise various implements, which perform specific "working" functions.

Articulated connections can be provided between such components to accommodate relative movement therebetween. For example, detachable hitches allow the equipment systems to be reconfigured in various combinations, depending on the task at hand. Moreover, such articulated interconnections commonly accommodate relative movement between the components. Common examples in agricultural equipment systems include three-point hitches, clevis-type hitches, drawbars, etc. "Free" movement articulated connections include pivotal hitches. "Fixed" articulated connections include two-point and three-point hitches. Both types of articulated connections allow relative movement between the motive and working components. Such relative movement may be necessary to accommodate turning, as in the case of tractors pulling wheeled ground-working implements along curved travel paths, which are accommodated by pivotal hitches. Relative movement in the case of two-point and three-point hitches can involve adjusting implement height, pitch and other attitudes with respect to a tractor.

An example of articulated equipment with GPS-based guidance capabilities is shown in U.S. Pat. No. 6,539,303 for GPS Derived Swathing Guidance System, which is incorporated herein by reference. GPS guidance can utilize absolute positioning techniques based on GPS coordinates, or relative positioning based on previous travel paths and previously identified locations. Various error correction techniques are employed to improve the accuracy of GPS positioning. For example, Whitehead U.S. Pat. No. 6,397,147 for Relative GPS Positioning Using a Single GPS Receiver with Internally Generated Differential Correction Terms and U.S. Pat. No. 6,469,663 for Method and System for GPS and WAAS Carrier Phase Measurements for Relative Positioning are assigned to CSI Wireless Inc. and are incorporated herein by reference. This technology is available from CSI Wireless Inc. under its trademark "e-Dif™". The Global Navigation Satellite System ("GNSS") currently includes GPS, the GLONASS ("GLObal NAvigation Satellite System") satellites of the former USSR and other satellite ranging technologies. Current GNSS augmentation systems include WAAS (Wide Area Augmentation System) in the United States, EGNOS (European Geostationary Navigation Overlay System) in Europe and MSAS (Multi-functional Transport Satellite Space-based Augmentation System) in Japan. Each of these augmentation systems, which are all compatible, includes a ground network for observing the GPS constellation, and one or more geostationary satellites.

Relatively precise GPS positioning can be achieved with real time kinetic ("RTK") technology. For example, U.S. Pat. No. 6,469,663 for Method and System for GPS and WAAS Carrier Phase Measurements for Relative Positioning discloses a single frequency RTK solution, and is incorporated herein by reference. Such greater precision can significantly expand the commercial applications for DGPS-based positioning and navigation. For example, in row crop agriculture, sub-meter tolerances are necessary to avoid equipment damage to crops. The application of DGPS-based automatic guidance offers the potential for reducing steering deviation associated with manual steering and guidance based on disk markers, foam markers and other prior art, non-automated techniques. However, guiding articulated agricultural equipment is particularly challenging because crop damage can be caused by either the motive or the working component, or both.

The present invention addresses this problem by providing a system and method for positioning a working component relative to a motive component by a power-articulation of the hitch or other connection therebetween. Heretofore there has not been available an articulated equipment position control system and method with the advantages and features of the present invention.

Other related art patents include: U.S. Pat. No. 6,434,462 for GPS Control of a Tractor-Towed Implement; U.S. Pat. Nos. 5,511,623 and 5,664,632 for Quick Hitch Guidance Device; and U.S. Pat. No. 5,725,230 for Self Steering Tandem Hitch.

SUMMARY OF THE INVENTION

In the practice of the present invention, a system and method are provided for controlling the position of an articulated connection between motive and working components in an equipment system. The motive component can comprise a tractor or other piece of equipment, which is designed to pull, push or otherwise transport a working component, such as a ground-working implement, in an articulated equipment system. Control can be based on GPS positional data, and various types of DGPS (Differential GPS) controls can be used, including WAAS and other suitable error-correction functionalities. A relatively simple configuration with a single DGPS antenna solution can be used. This gives the operator guidance as well as providing a correction reference for the implement position. The system includes a DGPS receiver, which is preferably mounted on the motive vehicle. A control subsystem includes an on-board computer, which receives positional data from the DGPS receiver, processes same along with various other input data, and outputs signals that control the working component position through the articulated interconnection. The system and method have several operating modes, including "Follow GPS/Guidance" whereby the connection maintains the position of the implement on a predetermined travel path. In a "Follow/Match Tracks" mode the articulated connection conforms the travel path of the implement to that of the motive component. A "Manual" operating mode is provided for direct operator control. Both straight-line and contour travel paths can be accommodated.

BRIEF DESCRIPTION OF THE DRAWINGS

FIG. 10A is a table showing a Setup: Hitch Calibrate menu.

DETAILED DESCRIPTION OF THE PREFERRED EMBODIMENTS

I. Introduction and Environment

Figure 1:
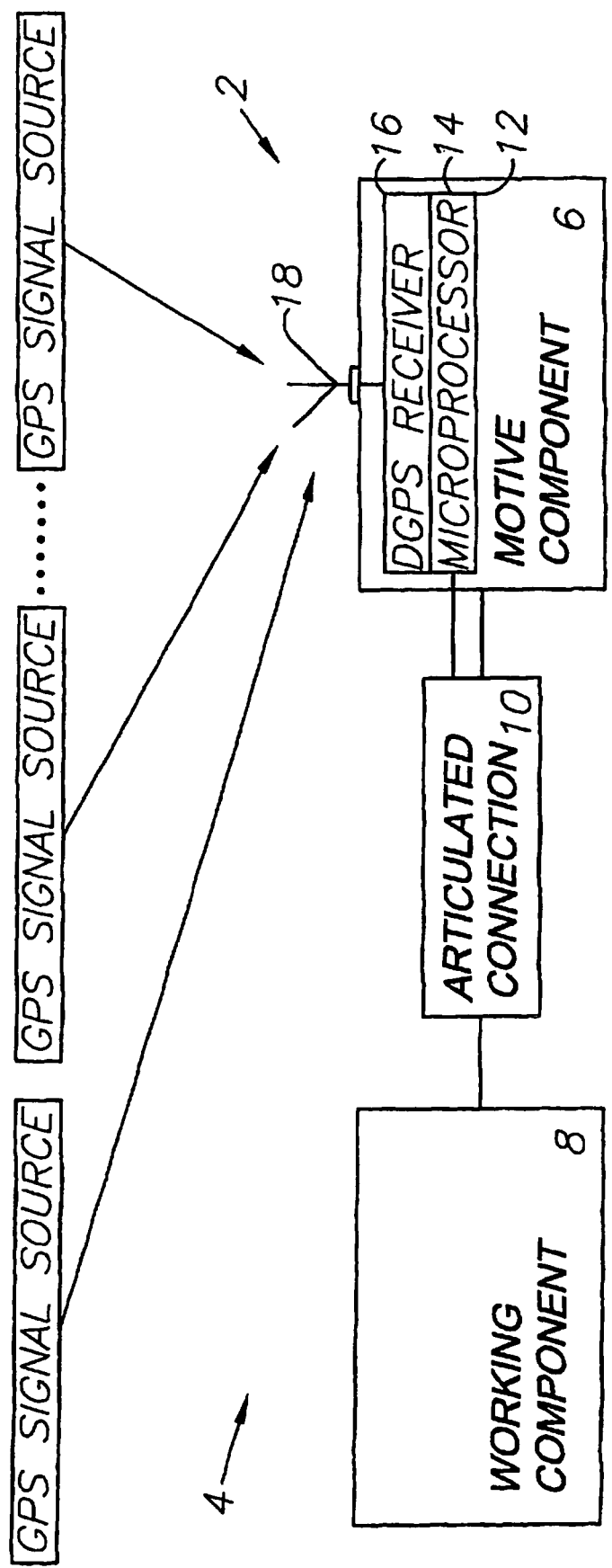
FIG. 1 is a block diagram of articulated equipment with a DGPS-based position control system embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

II. Preferred Embodiment Articulated Equipment System 2

Referring to the drawings in more detail, the reference numeral 2 generally designates an articulated equipment position control system embodying the present invention. Without limitation on the generality of useful applications of the control system 2, equipment 4 comprising a motive component 6 connected to a working component 8 through an articulated connection or hitch 10 is shown. Without limitation on the generality of articulated connections that can be utilized with the present invention, the hitch 10 can comprise, for example, an Adjustable Draw Bar Offset as shown and described in the Miller U.S. Pat. No. 6,631,916, which is incorporated herein by reference. Such a hitch is available as an Outback Hitch product of RHS, Inc. of Hiawatha, Kans. Also by way of example, the motive component 6 can comprise a tractor and the working component 8 can comprise a ground-working implement. However, the position control system 2 can be applied to other equipment configurations for a wide range of other applications. Such applications include equipment and components used in road construction, road maintenance, earthworking, mining, transportation, industry, manufacturing, etc.

III. Control Subsystem 12

The power-articulated connection 10 enables positioning the working component 8 from the motive component 6 by means of a control subsystem 12. The control subsystem 12 is associated with and mounted in the motive component 6, for example, inside the tractor cab thereof. The control subsystem I2 includes a microprocessor 14 which receives input signals from a DGPS receiver 16 connected to an antenna 18, which can be mounted on the roof of the tractor cab. The microprocessor 14 processes and stores the differentially corrected positional data received through the DGPS receiver 16.

Figure 2:
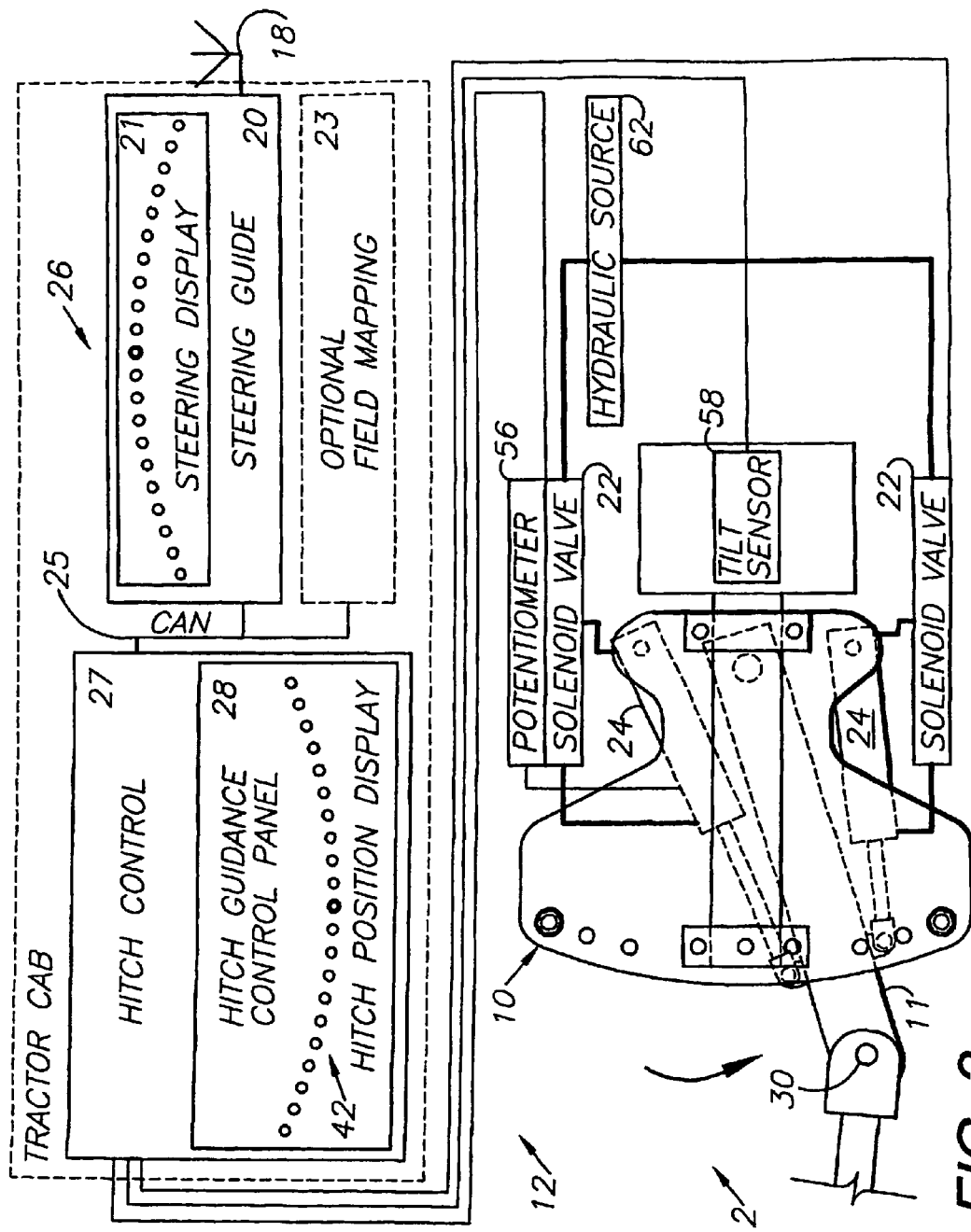
FIG. 2 is a schematic diagram of the position control system applied to agricultural equipment comprising a tractor and an implement with a power-articulated pivotal hitch.

FIG. 2 shows an exemplary configuration of the control subsystem 12 with a steering guide 20, which can comprise an Outback S steering guide available from RHS, Inc. of Hiawatha, Kans. and manufactured by CSI Wireless Inc. of Calgary, Canada. The Outback S steering guide is described in U.S. Pat. No. 6,539,303 for GPS Derived Swathing Guidance System, which is incorporated herein by reference. The steering guide 20 includes a steering display 21 with an arcuate array of steering indicator lights for guiding an operator along a travel path. An optional field mapping device 23 can be connected to the steering guide 20 by a CAN cable 25. The field mapping device 23 can comprise, for example, an Outback 360 device available from RHS, Inc. of Hiawatha, Kans. and manufactured by CSI Wireless Inc. of Calgary, Canada. A hitch position control device 27 is connected to the steering guide 20 through the CAN cable 25 and includes an arcuate hitch position display 42 with multiple indicator lights 44 (FIG. 4), as described in more detail below. The output devices connected to the control subsystem 12 include solenoid-controlled valves 22 for operating piston-and-cylinder units 24, which are operably connected to the hitch 10 and to an hydraulic fluid pressure source 62. The hitch 10 includes a pivotable draw bar 11 with a hitch pin 30 mounted at its trailing end for connecting the working component 8.

Figure 3:
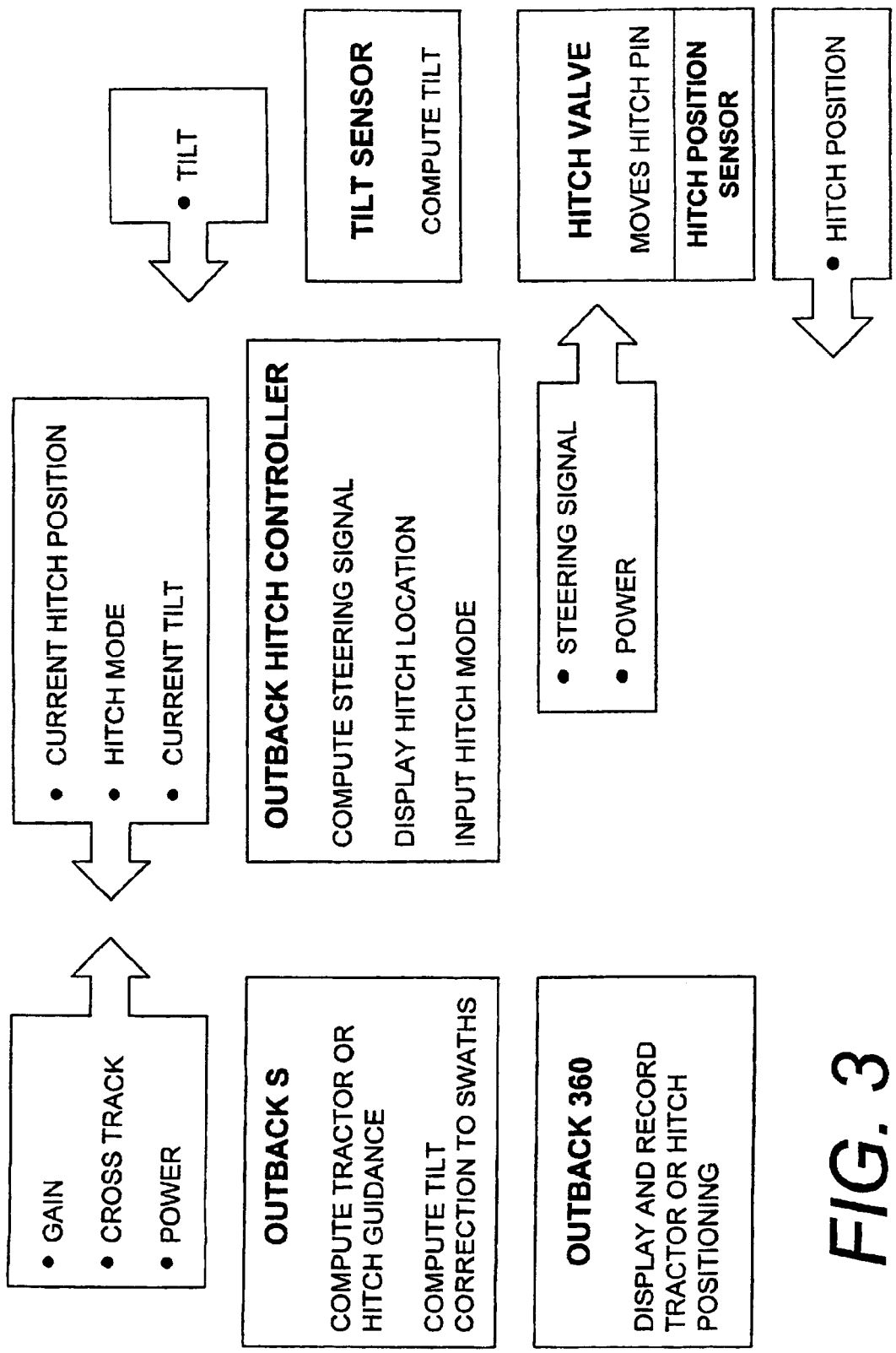
FIG. 3 is a communication diagram of the position control system shown in FIG. 2.
Figure 3A:
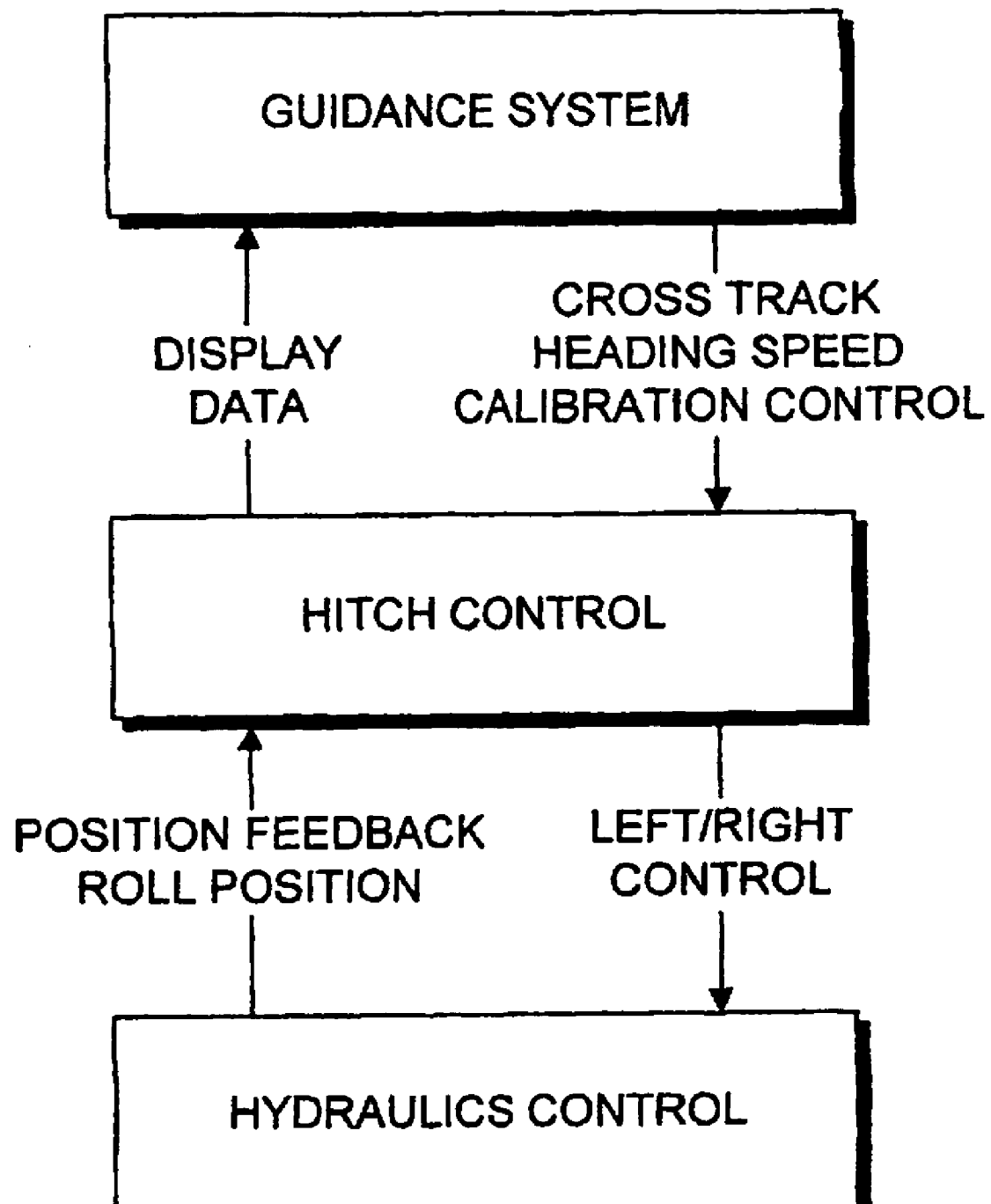
FIG. 3A is a block diagram of the major components of the position control system, showing interrelationships therebetween.

FIG. 3 is a communication diagram for the position control system 2. FIG. 3A is a block diagram showing the major components of the system 2 and some of the types of data and control signals, which are transmitted among the system components in operation.

Figure 4:
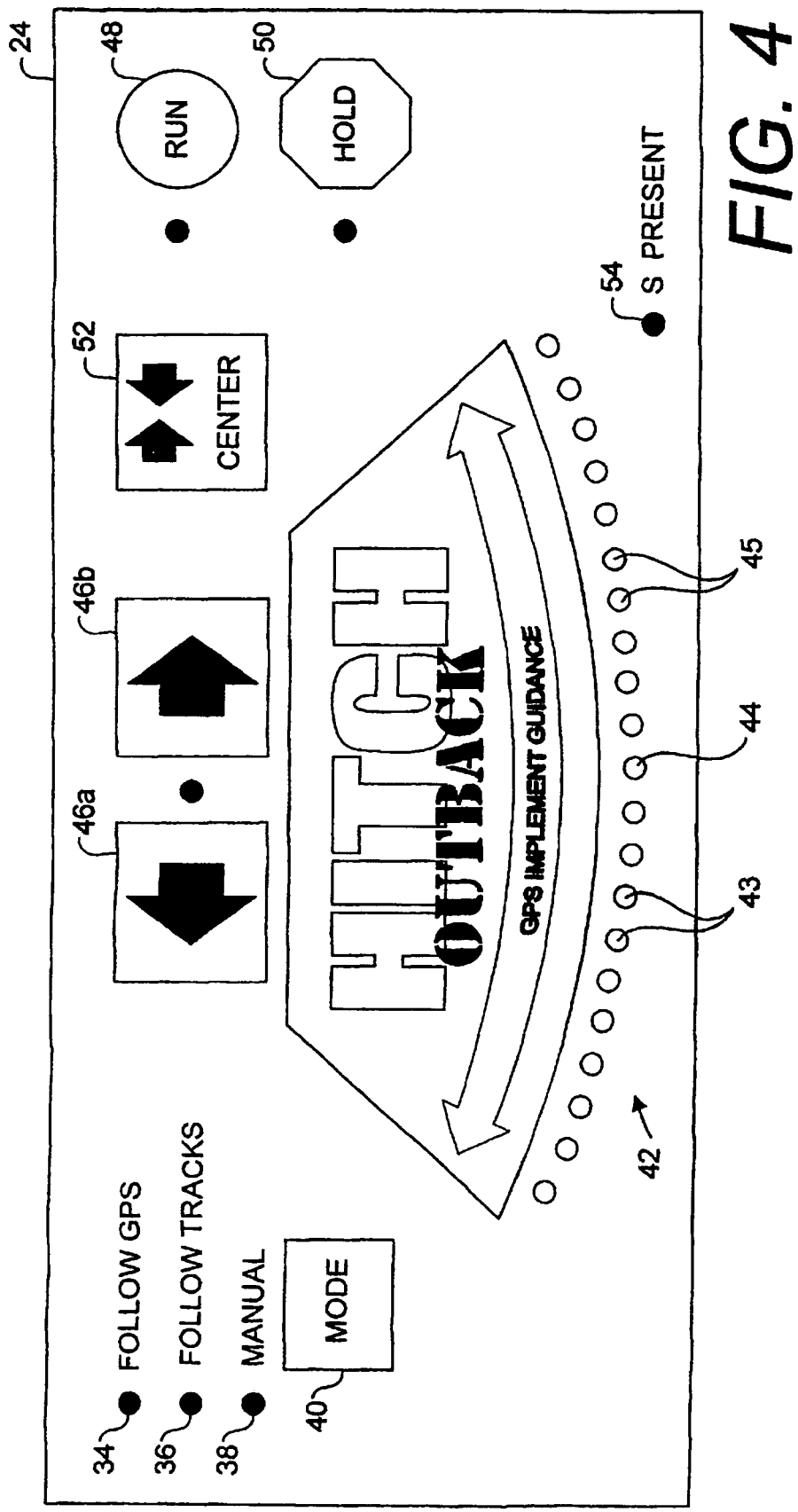
FIG. 4 is a front elevational view of an operator interface including the input and output devices for controlling and displaying the operation of the system.

A hitch position control input/output ("I/O") user interface 26 includes a hitch guidance control panel 28 (FIG. 4). The control panel 28 includes indicators for "Follow GPS" mode 34, "Match Tracks" mode 36 and "Manual" mode 38. A mode selector switch 40 is provided for sequentially cycling through the operating modes, as indicated by the indicators 34, 36 and 38.

A downwardly-concave, arcuate hitch position indicator light array 42 comprises multiple left side (port) indicator lights 43, a center indicator light 44 and multiple right side (starboard) indicator lights 45. The lights 43, 45 can be color-coded (e.g., left red and right=green). The amount of lateral hitch swing or deflection is proportionally indicated by the number of lights 43, 45 illuminated on either side of the center light 44. The control panel 28 includes left and right switches 46a, b respectively, which are used for swinging the implement 8 left and right respectively. A "RUN" switch 48 is provided for initiating operation of the control subsystem 12. A "HOLD" switch 50 effectively pauses the control software. A "CENTER" switch 52 centers the hitch 10. The "S Present" indicator light 54 indicates the operation of the steering guide 20, e.g. an "Outback S™" system.

Additional input to the control subsystem 12 is provided by a potentiometer 56 associated with a respective piston-and-cylinder unit 24 for indicating the extended/retracted condition thereof. The cross-track, curvature and lilt inputs are calibrated relative to the valve potentiometer 56 position. A tilt sensor 58 is mounted on the hitch 10 for indicating a tilt angle of the equipment 4, which input data are utilized in correcting for sloping field conditions.

IV. Operation

In one exemplary application of the system 2, a clevis-type, pivotal hitch 10 is power-articulated to adjust the position of a working implement 8 with respect to a tractor 6. A "Towed Point" at the hitch pin 30 is adjusted mechanically based on and in response to inputs, which can include: GPS-derived signals indicating cross-track error (i.e., steering error representing displacement from the desired track 32 (FIG. 7A)); GPS-derived speed; GPS-derived heading; and tilt as detected by the tilt sensor 58.

The system 2 has three modes of operation: Follow GPS/Guidance, Follow/Match Tracks and Manual.

Figure 7:
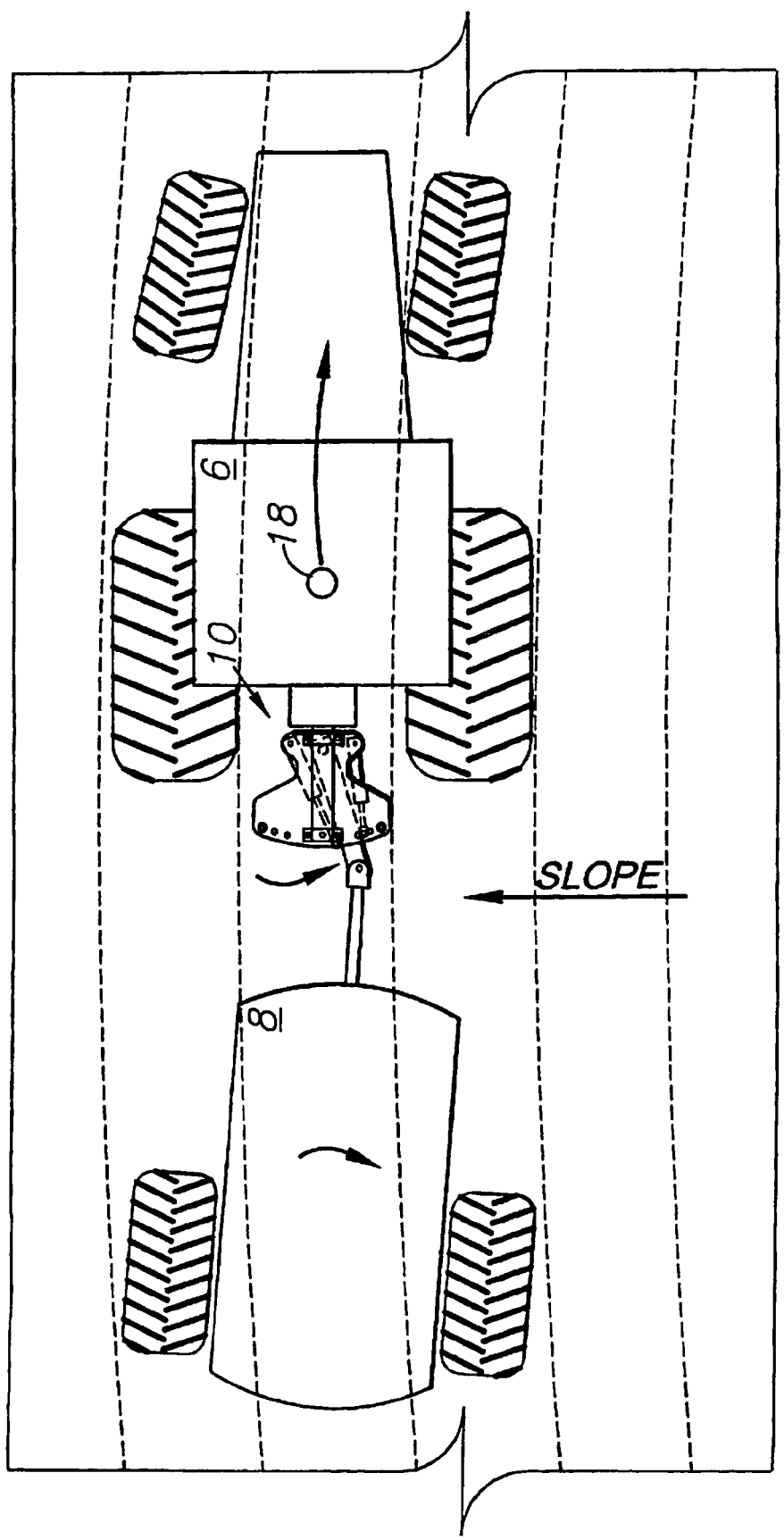
FIG. 7 is a top plan view of the tractor-and-implement system, shown with the articulated hitch correcting the implement position through a turn on a slope in a Follow/Match Tracks, contour operating mode.
Figure 7A:
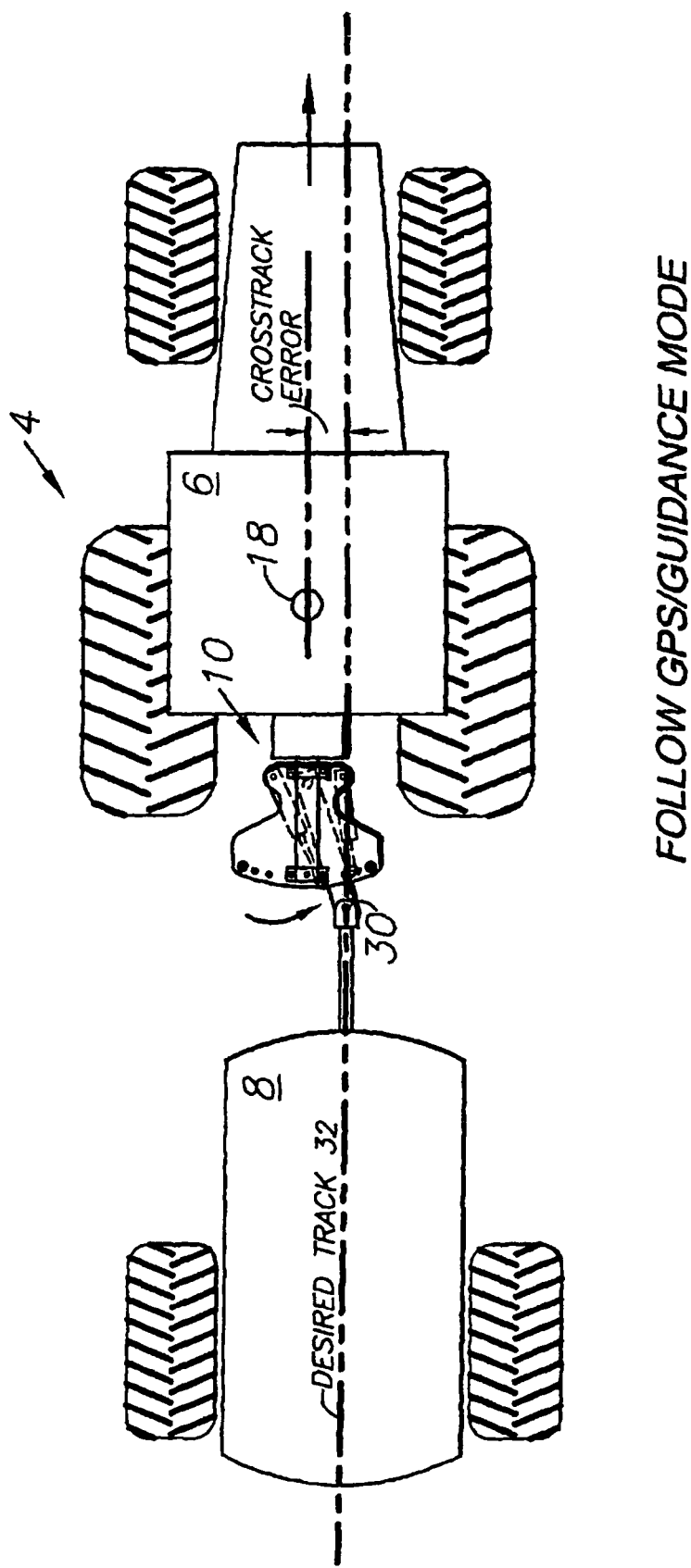
FIG. 7A is a top plan view of the tractor-and-implement system, shown with the articulated hitch correcting a steering deviation cross-track error with the system in a Follow GPS/Guidance, straight-line operating mode.
Figure 8:
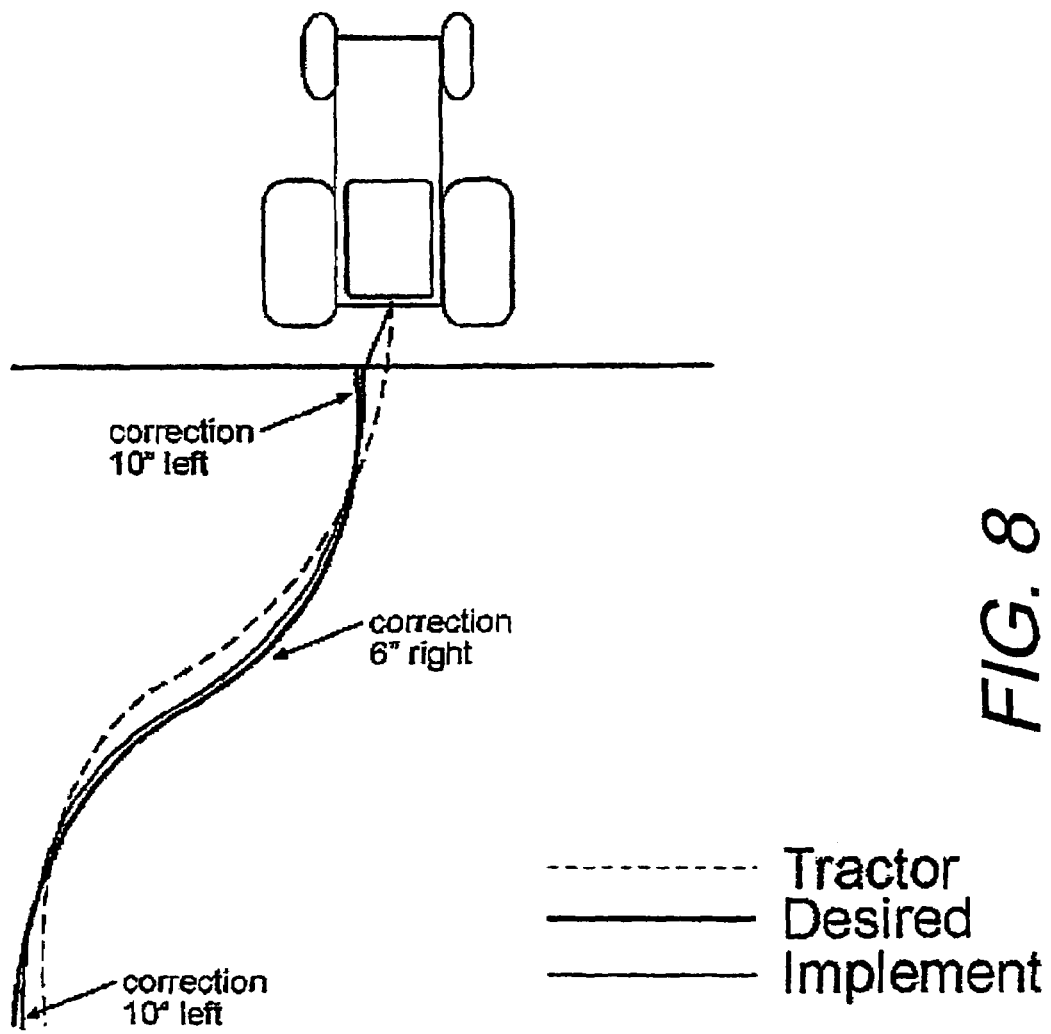
FIG. 8 shows the operation of the system in a Follow DGPS/Guidance mode.
Figure 9:
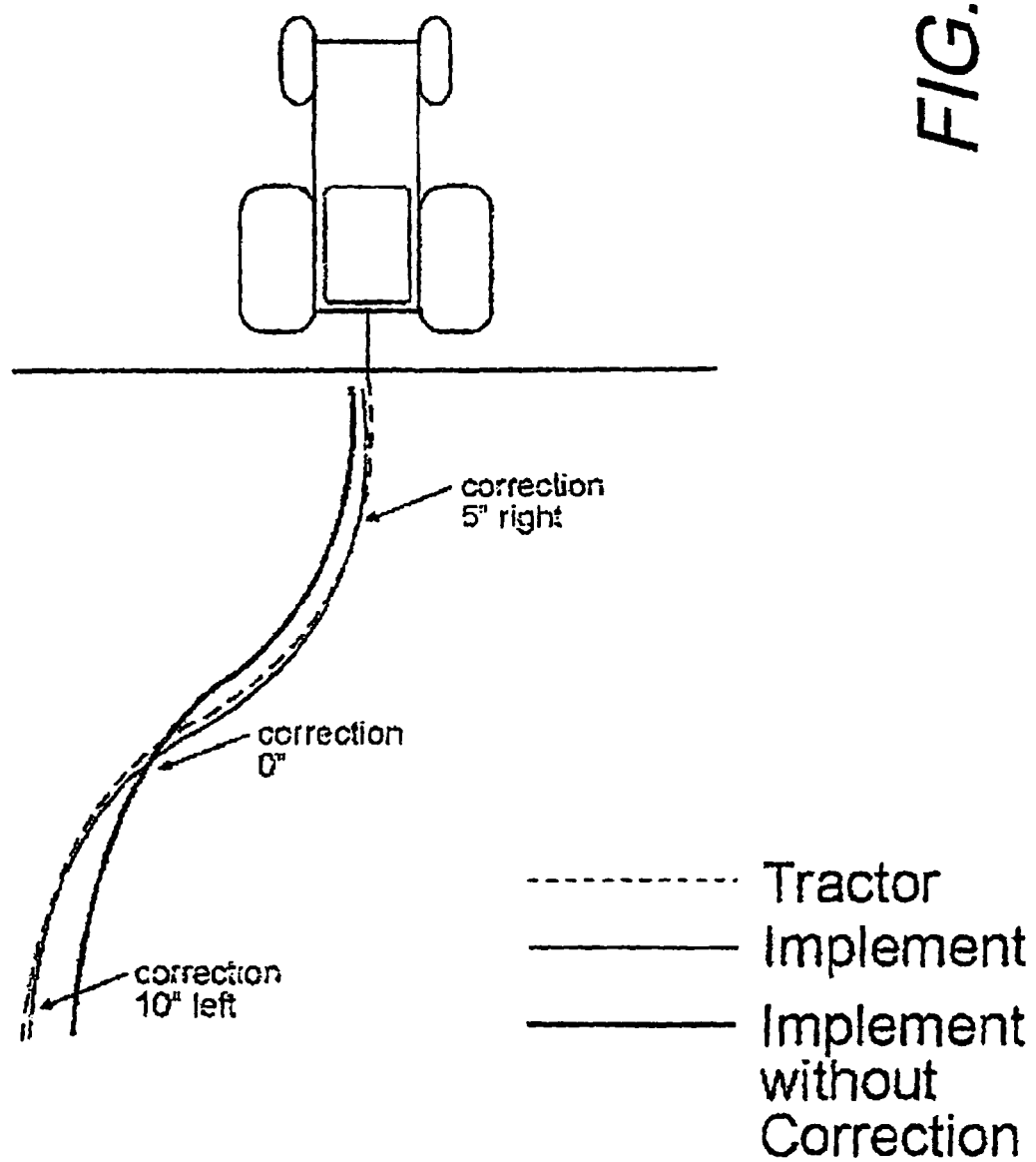
FIG. 9 shows the operation of the system in a Follow/Match Tracks mode.

1. Follow GPS/Guidance Mode (FIGS. 7A and 8). The system 2 corrects operator errors and course deviations by positioning the implement 8 on the desired track. Operation is in either straight mode (sometimes referred to as point A-to-point B or A-B guidance), where straight lines are followed (FIG. 7A), or contour mode (FIG. 8), where guidance is against a previously driven pass. Driver error is corrected through compensation by the hitch position on the towing vehicle 6 so that the working implement 8, and equipment thereon, are better positioned, which minimizes overlap and missed areas. In guidance mode, positional cross-track steering error information is provided by the steering guide 20, which can assist the operator in maintaining the tractor 6 on a desired travel path. Operator deviations from the desired travel path are accommodated by the control system 2, whereby the implement 8 is maintained on course, regardless of operator-based errors and course deviations. The corrected travel path data are input to the control subsystem 12 based on actual hitch pin 30 positions. Therefore, the system 2 is able to accurately track and record the travel path of the implement 8, regardless of the tractor 6 course deviations. Hitch position (hitch line) is calculated relative to the cab antenna 18 position. The hitch automatically maintains the hitch pin 30, and therefore the implement 8, on the desired track 32, compensating for tractor steering deviations (FIG. 7A).

In Follow GPS/Guidance mode, the cross-track error of the GPS steering guide 20, which is typically mounted on the tractor 6, from the present position to the desired track is used as the feedback element for the system. The guidance mode can be either straight (FIG. 7A) or contour mode. The cross-track error is thus used to power-articulate the hitch 10 to move it a corresponding amount up to its maximum travel. For example, if the DGPS navigation system 12 shows that the tractor 6 is six inches to the left of the GPS guideline or desired track 32, the hitch 10 will be moved six inches to the right, thus placing the hitch pin 30 approximately over the desired track 32 (FIG. 7A). Using the GPS positioning data from the steering guide 20 and the hitch position signals from the potentiometer 56 through the hitch control 27, the hitch pin 30 position is maintained generally over the GPS guideline or desired track 32. The towed implement 8 is thus placed in the correct position. The system 2 functions in this manner in both straight-line and contour submodes of the Follow GPS/Guidance operating mode.

2. Follow/Match Tracks Mode (FIGS. 5-7 and 9). In this mode the system 2 corrects for curvature and slope by positioning the trailer or implement 8 to follow in the tracks of the tractor 6. Otherwise the implement could slip downslope and/or shortcut turns and cause damage by running over the crop rows. With the system 2 in Follow/Match Tracks operating mode, the hitch 10 is adjusted to compensate for tilting and curvature effects on the equipment 4. Such effects are encountered in fields with sloping and/or contour (i.e. curved travel path) conditions. The wheels of the pulled implement 8 will thus follow in the tracks of the tractor 6 in order to minimize crop damage.

Figure 5:
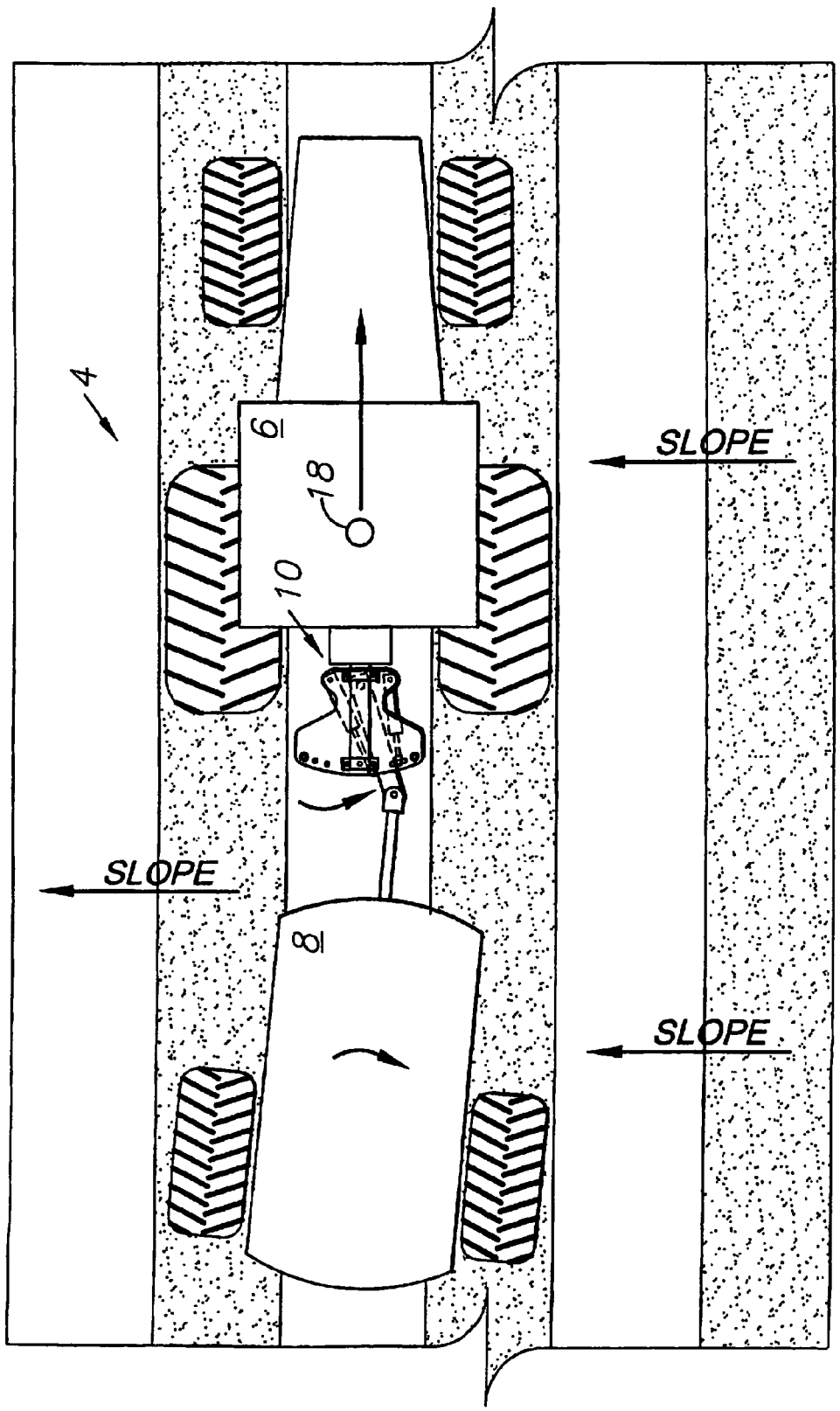
FIG. 5 is a top plan view of the tractor-and-implement system, shown with the articulated hitch correcting the implement position in response to a cross-slope field condition with the system in a Follow/Match Tracks, straight-line operating mode.
Figure 6:
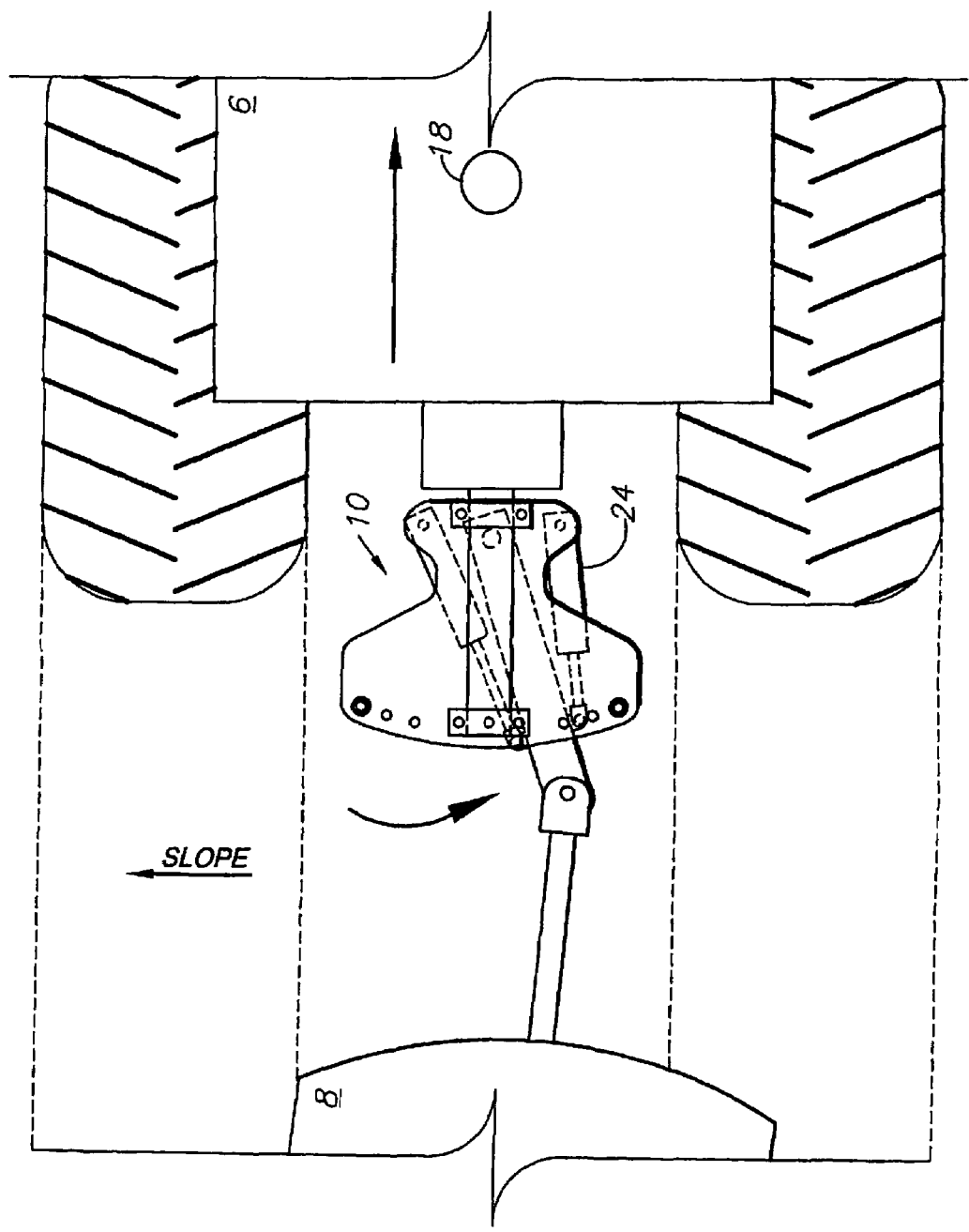
FIG. 6 is an enlarged, fragmentary top plan view thereof.

With "Follow Tracks" mode selected on the control panel (FIG. 4), the tilt sensor 58 outputs a slope value. The system 2 will compensate for the slippage by moving the hitch 10 up-slope (FIGS. 5 and 6). Depending on load and soil conditions, this compensation value is variable and can be adjusted on-the-fly with the left and right arrow switches 46a and 46b respectively.

At least five conditions are possible: a) straight/level, therefore no correction; b) straight/side slope, therefore correction for one variable; c) turn/level, therefore correction for one variable; d) turn/downhill, therefore correction for two variables; and e) turn/uphill (FIG. 7), therefore correction for two variables.

3. Manual Mode. In this mode the operator can manually control articulation of the hitch 10 through the left/right switches 46a/46b. The hitch 10 can be centered with the center switch 52 (FIG. 4).

Figure 10:
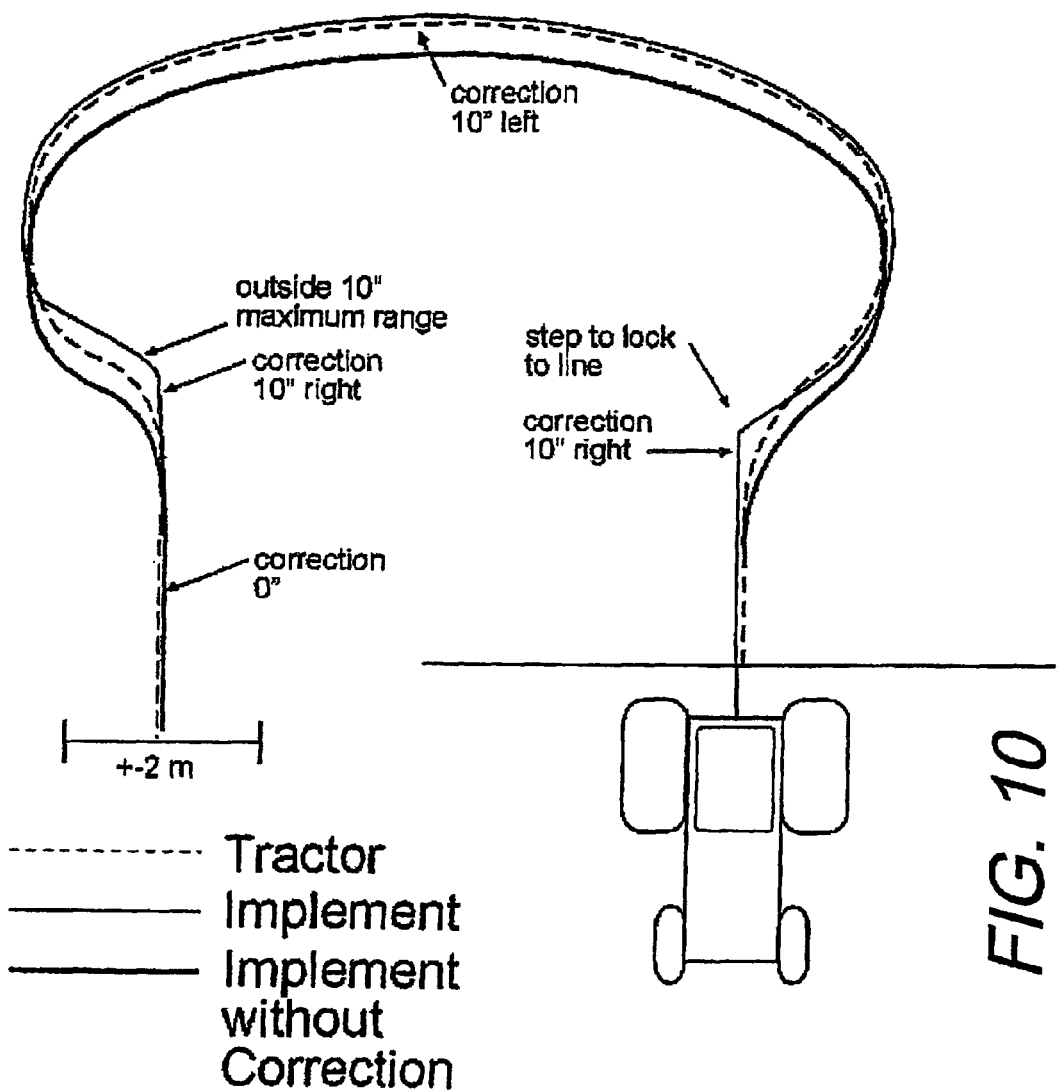
FIG. 10 shows the operation of the system in an End Turn procedure.

FIG. 10 shows an automatic turnaround detection feature, which is activated when the hitch 10 deviates more than a predetermined distance, such as two meters, from the guideline. It automatically swings the hitch 10 to a far outside-of-turn position. At the end of each pass, the control subsystem 12 detects such a deviation from a predetermined guidepath, or desired track 32, whereupon the system 2 enters an end-of-turn procedure to facilitate tightly turning the equipment 4. Such turns are typically "keyhole" turns. The implement is first turned in one direction and the hitch 10 is shifted to the outside of that direction, whereafter the operator turns the equipment in the other direction through more than 180 degrees with the hitch 10 shifted to the outside of that turn, followed by a final turn with the hitch 10 shifting to the outside of the final turn. This feature avoids conflict between the components 6, 8 during tight turns, such as those which may be encountered at the ends of passes. At the end of each row when the vehicle is turning the operator typically carries out what is called a keyhole turn. This allows the vehicle and trailer to be turned in a minimal distance. In either Follow GPS/Guidance mode or Follow/Match Tracks mode, an automatic feature, without user intervention, is that curvature correction moves the hitch to the outside of the turn. This aids in the tightness of the turn achievable by a tractor and trailer by keeping the trailer away from the inside wheels. When the system 2 deviates from the desired track 32 by more than a predetermined distance (e.g., about two meters), the end-of-turn procedure described above is automatically initiated. Thus, the operator can concentrate on completing the turn while the system 2 automatically positions the hitch 10 most advantageously. Automatic return to normal operation occurs after the turn is complete.

A technique to generate an accurate radius of curvature has been developed from the DGPS (Differential Global Positioning System) heading information. This value has been found to be proportional to the amount of hitch position movement required to make the implement 8 wheels follow those of the tractor 6. Similarly, a tilt sensor input is measured and calibrated to maintain the implement wheels in the tracks of the tractor wheels. The microprocessor 14 generates the required signals to activate the piston-and-cylinder unit hydraulic valves 22 whereby the hitch 10 accomplishes the required corrections.

Curvature correction is calculated from the GPS information. Heading and speed are input whereby the system automatically generates the required radius of curvature. Using the heading information, typically generated at a rate of 5 Hz, the rate of heading change can be calculated in degrees per second. A best fit algorithm of heading and time is used to reduce noise and generate a more stable rate of turn. By knowing the ground speed of the vehicle, the radius of curvature of any turn is calculable with the GPS positioning data inputs. With rate of turn ROT in degrees per second and speed S in meters per second, the radius of curvature R in meters can he generated from the formula:

$$R = S*1801(pi*ROT)$$

The line of travel that the hitch 10 has to travel in order to allow the trailer tires to follow in line with those of the tractor is inversely proportional to this radius of curvature value. The tighter the turn the more compensation is required up to the limit of the hitch movement. This proportional relationship is generally consistent for similar tractor/trailer configurations.

V. Calibration Process

FIG. 10A shows a menu for calibrating the system 2 in a setup procedure. The menu appears on the steering display 21, which is part of the steering guide 20. Operator inputs are made via the steering guide 20 and the hitch guidance control panel 28 (FIG. 4). Position adjustment is accomplished by moving the hitch pin to its far left position with the left arrow switch 46a, then ENTER; moving the hitch pin to its far right position with the right arrow switch 46b, then ENTER; and centering the hitch with the CENTER switch 52, then ENTER. Curvature adjustment is accomplished by driving around a curve on relatively flat ground while observing the trailing implement tracking. The left and right arrow switches 46a and 46b respectively can be used to position the implement for accurate "Match Tracks" positioning. The curvature compensation value is then updated by pressing ENTER. Slope calibration is accomplished by placing the tractor 6 on level ground with the slope function "ON", then ENTER to update the level reference value.

V. Error Correction (D)GPS errors can be: a) corrected as necessary using existing error-correction techniques, such as government-sponsored WAAS and EGNOS, commercially available differential services such as those supplied by OmniStar and RACAL, e-Dif differential techniques, and both focal and wide area RTK methods.

Improved positioning can be achieved by using two DGPS receivers, with antennas mounted on the tractor for operator guidance and on the implement for implement control, as discussed below.

VII. First Modified Embodiment Dual-Receiver System 102

Figure 11:
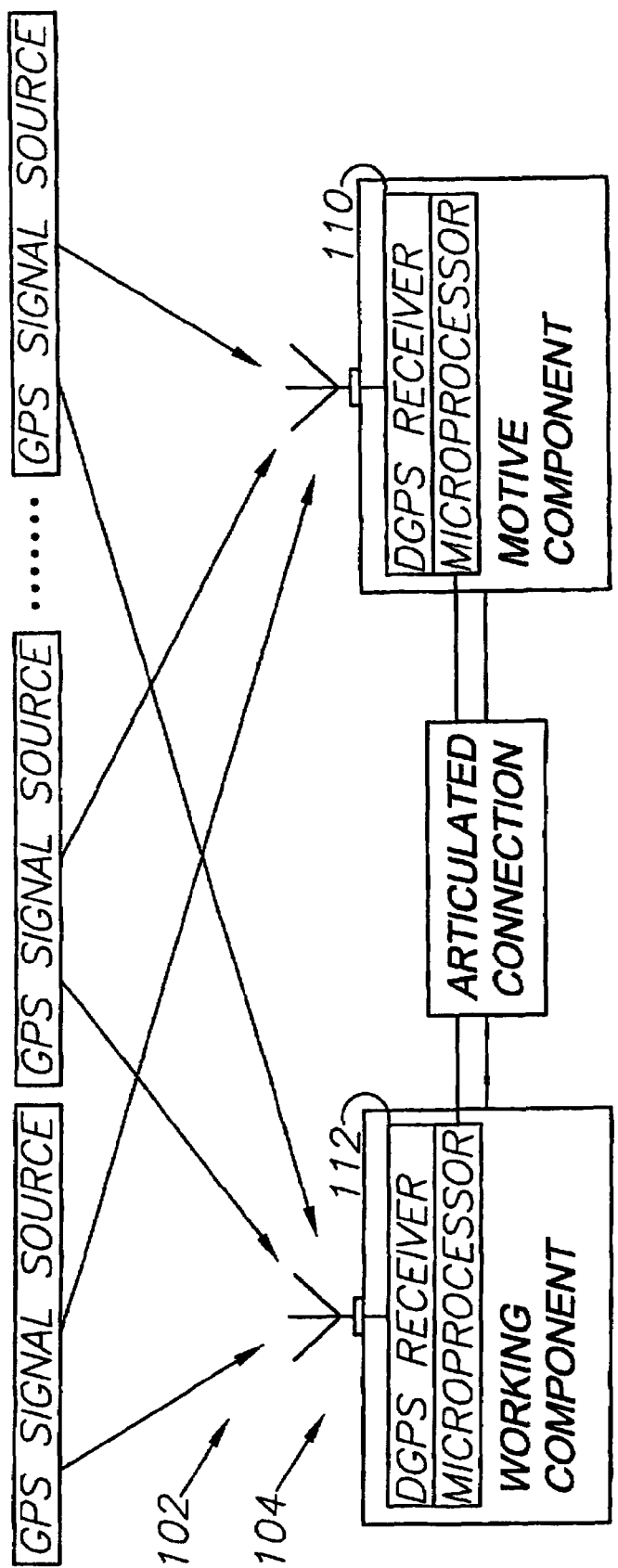
FIG. 11 is a block diagram of a DGPS-based position control system for articulated equipment, which system comprises a first modified embodiment of the present invention with first and second DGPS receivers.

FIG. 11 shows articulated equipment 104 with a position control system 102 comprising a first modified embodiment of the present invention. The system 102 includes first and second DGPS receivers 110, 112 mounted on motive and working components 106, 108 respectively. This configuration can be used for automatic steering of the motive component 6 using the first DGPS receiver 110 and tine positioning of the working component (implement) 8 using the second DGPS receiver 112.

It is to be understood that the invention can be embodied in various forms, and is not to be limited to the examples discussed above. Other components can be utilized. For example, the working component can comprise a sprayer with spray booms connected to a vehicle and adapted to be raised and lowered in response to GPS position data.

Having thus described the invention, what is claimed as new and desired to be secured by Letters Patent is:

1. A position control method for positioning a working component relative to a motive component, which comprises the steps of:
   providing an articulated connection between said components;
   providing said motive component with a first locating device including a DGPS receiver;
   providing a OPS output from said first locating device corresponding to a position of said motive component;
   providing a second locating device associated with said working component;
   providing an output from said second locating device locating said working component relative to said motive component;
   providing a controller;
   connecting said controller to said locating devices;

providing a positioning device connected to said controller;

operably and drivingly connecting said positioning device to said working component;

providing a positioning signal output from said controller; and positioning said working component relative to said motive component with said positioning device in response to said positioning signal.

2. A position control method for independently positioning interconnected motive and working components, which comprises the steps of:

providing an articulated connection between said components;

providing said motive component with a first locating device including a GNSS receiver;

providing a GNSS output from said first locating device corresponding to a position of said motive component:

providing a second locating device associated with said working component;

providing an output from said second locating device locating said working component;

providing a controller;

connecting said controller to at least one of said locating devices;

providing a positioning device connected to said controller and to said working component;

providing a positioning signal output from said controller; and positioning said working component with said positioning device in response to said positioning signal.

3. The method of claim 2, which includes the additional steps of:

providing said second locating device with a second GNSS receiver;

providing a GNSS output from said second locating device corresponding to a GNSS position of said working component;

providing said controller with first and second microprocessors on said motive and working components respectively;

connecting said first and second microprocessors to said first and second receivers respectively; and positioning said working component relative to said motive component with said positioning device in response to said positioning signal output.

4. The method of claim 2, which includes the additional steps of:

storing GNSS-based straight and curved desired tracks in said controller; and providing position-correcting output to said positioning device in response to deviations of said motive component from a desired track.

5. The method of claim 2, which includes the additional steps of:

providing an articulated connection between said motive and working components;

providing said articulated connection with a power-actuated hitch including a laterally-movable drawbar and a hitch pin mounted thereon and connected to said working component;

providing said hitch with a clevis configuration;

providing said drawbar with a front end pivotably connected to said motive component and a trailing end connected to said working component;

providing an hydraulic subsystem including an hydraulic pressure source associated with said motive component, an hydraulic actuator connected to said hydraulic pressure source and to said the drawbar for pivoting same and an hydraulic valve selectively controlling pressurized hydraulic fluid flow from said pressure source to said hydraulic actuator;

connecting said controller to said hydraulic valve and controlling the operation of said hydraulic valve with said controller;

providing said hitch with an hydraulic piston-and-cylinder unit connected to said hydraulic power source and to said drawbar, said piston-and-cylinder unit being adapted for pivoting said drawbar;

providing said second locating device with a potentiometer connected to said piston-and-cylinder unit;

outputting a signal from said potentiometer proportional to a position of said piston-and-cylinder unit and corresponding to the orientation of said hitch;

connecting said positioning device to said hitch;

preprogramming said controller to laterally shift said hitch in response to deviations of said motive component from a respective desired track; and generally following said desired track with said hitch in response to said controller.

6. The method of claim 5, which includes the additional steps of:

mounting a tilt sensor on one of said components and providing an output corresponding to a tilt condition thereof;

preprogramming said controller with a tilt-correcting function adapted to proportionally, laterally shift said hitch in response to a detected tilt condition and a required compensating adjustment;

preprogramming said system with a curvature-correcting function adapted to proportionally, laterally shift said hitch in response to a detected curvature of said vehicle track and a required compensating adjustment of said working component track; and calibrating said tilt-correcting and curvature-correcting functions in either or both of a stationary and an on-the-fly condition of said system.

7. The system of claim 2, which includes the additional steps of:

providing said controller with an end-of-row turn compensating function; and biasing said hitch laterally outwardly in response to said system detecting an end-of-row condition corresponding to a predetermined crosstrack deviation from a desired track.

8. The method of claim 2, which includes the additional steps of:

providing a steering guide subsystem with a steering display;

providing said steering display with cross-track error and heading information and displaying said information to an operator; and connecting said steering guide subsystem to said controller whereby said steering display information is based on GNSS data.

9. The method of claim 2, which includes the additional steps of:

providing a straight-line operating mode adapted for guiding said implement along a relatively straight-line track;

providing a contour operating mode adapted for guiding said implement along a curvilinear track; and compensating for a turning radius based on motive component speed and rate-of-turn.

10. The method according to claim 2, which includes the additional steps of:

providing GNSS correction capability utilizing a signal correction system from among the group consisting of: WAAS (Wide Area Augmentation System), EGNOS (European Geostationary Navigation Overlay System); and MSAS (Multifunctional Transport Satellite Space-Based Augmentation System).

11. A position control method for positioning a working component relative to a motive component, which comprises the steps of:

providing an articulated connection between said components;

providing said motive component with a first locating device including a DOPS receiver;

providing a GPS output from said first locating device corresponding to a position of said motive component;

providing a second locating device associated with said working component;

providing an output from said second locating device locating said working component relative to said motive component;

providing a controller;

connecting said controller to said locating devices;

providing a positioning device connected to said controller;

operably and drivingly connecting said positioning device to said working component;

providing a positioning signal output from said controller;

positioning said working component relative to said motive component with said positioning device in response to said positioning signal;

providing said second locating device with a second GNSS receiver; and providing a GNSS output from said second locating device corresponding to a GNSS position of said working component;

providing said controller with first and second microprocessors on said motive and working components respectively;

connecting said first and second microprocessors to said first and second receivers respectively;

positioning said working component relative to said motive component with said positioning device in response to said positioning signal output;

storing GNSS-based straight and curved desired tracks in said controller;

providing position-correcting output to said positioning device in response to deviations of said motive component from a desired track;

providing a straight-line operating mode adapted for guiding said implement along a relatively straight-line track;

providing a contour operating mode adapted for guiding said implement along a curvilinear track; and compensating for a turning radius based on motive component speed and rate-of-turn.

* * * * *